United States Patent
Fleming

(10) Patent No.: US 6,419,303 B1
(45) Date of Patent: Jul. 16, 2002

(54) CAB ENCLOSURE FOR A SELF-PROPELLED EARTH MOVING MACHINE

(76) Inventor: Jeffery William Thomas Fleming, P.O. Box 2485, Lac la Biche, Alberta (CA), T0A 2C0

( * ) Notice: Subject to any disclaimer, the term of this patent is extended or adjusted under 35 U.S.C. 154(b) by 0 days.

(21) Appl. No.: 09/499,936

(22) Filed: Feb. 8, 2000

(30) Foreign Application Priority Data

Feb. 12, 1999 (CA) .............................. 2261523

(51) Int. Cl.[7] .............................................. B62D 25/06
(52) U.S. Cl. ...................... 296/190.01; 296/79; 296/80; 296/190.08
(58) Field of Search ...................... 296/190.01, 190.08, 296/77.1, 79, 80, 102

(56) References Cited

U.S. PATENT DOCUMENTS

| | | | | |
|---|---|---|---|---|
| 1,080,812 A | * | 12/1913 | Cretors | 296/77.1 |
| 2,256,890 A | * | 9/1941 | Brown et al. | 296/80 |
| 3,572,819 A | * | 3/1971 | Moore | 296/102 |
| 3,610,677 A | * | 10/1971 | Hawley | 296/190.08 |
| 3,709,553 A | * | 1/1973 | Churchill et al. | 296/77.1 |
| 4,098,536 A | * | 7/1978 | Mills | 296/77.1 |
| 4,139,233 A | | 2/1979 | Bott | |
| 4,488,732 A | * | 12/1984 | Lehmann et al. | 296/190.01 |
| 4,531,560 A | | 7/1985 | Balanky | |
| 4,688,846 A | * | 8/1987 | Martin, Jr. | 296/190.08 |
| 4,773,694 A | * | 9/1988 | Gerber | 296/77.1 |
| 4,781,231 A | | 11/1988 | Garcia et al. | |
| 4,930,835 A | * | 6/1990 | Bruce et al. | 296/77.1 |
| 5,259,656 A | * | 11/1993 | Carroll | 296/77.1 |
| 5,273,340 A | * | 12/1993 | Nelson et al. | 296/190.08 |
| 5,275,460 A | | 1/1994 | Kraus | |
| 5,286,081 A | * | 2/1994 | Martin, Jr. | 296/190.08 |
| 5,393,118 A | * | 2/1995 | Welborn | 296/77.1 |
| 5,413,188 A | * | 5/1995 | Ui | 296/190.08 |
| 5,429,404 A | * | 7/1995 | King, Sr. | 296/79 |
| 5,435,362 A | | 7/1995 | Chiang | |
| 5,588,690 A | * | 12/1996 | Showalter | 296/77.1 |
| 5,758,922 A | | 6/1998 | Wheatley | |
| 5,890,507 A | * | 4/1999 | Hinsperger | 296/77.1 |
| 5,961,175 A | * | 10/1999 | Clardy, Jr. | 296/77.1 |
| 6,149,228 A | * | 11/2000 | O'Niell et al. | 296/190.1 |

FOREIGN PATENT DOCUMENTS

| | | | | |
|---|---|---|---|---|
| GB | 002168656 A | * | 6/1986 | 296/190.08 |
| SU | 000672091 A | * | 7/1979 | 296/190.08 |
| WO | 094016932 A1 | * | 8/1994 | 296/190.08 |

OTHER PUBLICATIONS

Photographs of Fremar Vinyl Rops Covers brochure and actual cover. (No Date).

* cited by examiner

*Primary Examiner*—Stephen T. Gordon
*Assistant Examiner*—Hilary Gutman
(74) *Attorney, Agent, or Firm*—Christensen O'Connor Johnson Kindness PLLC

(57) ABSTRACT

A cab enclosure for a self-propelled earth moving machine which includes a plurality of flexible planar fabric panels namely, a front panel, a rear panel, a right side panel and a left side panel. Each of the panels having a top edge, a bottom edge, opposed side edges, and at least one transparent viewing window. Mating fasteners are positioned along the opposed edges of each of the panels, whereby adjoining panels are secured together to form an enclosure. The top edge of each of the panels being secured to a canopy of an open metallic cab structure of the self-propelled earth moving machine, whereby the panels hang like drapes to enclose the cab.

1 Claim, 7 Drawing Sheets a cab enclosure for a self-propelled earth moving machine, such as a bulldozer or any other open canopy crawler tractor.

BACKGROUND OF THE INVENTION

Most bulldozers have open canopy cabs that expose the equipment operator to the elements. The operator is exposed to the cold of winter, the mosquitos of summer and the winds of spring and fall. As a result, there are often times when it is not pleasant operating a bulldozer. Bulldozers can be purchased with closed cabs, but they are relatively rare and more expensive. The most common cab structure consists of a protective roof held up by columns spaced at intervals about the periphery of the roof. The spaces between the columns are open. This provides the operator with good visibility, but also exposes the operator to the elements.

SUMMARY OF THE INVENTION

What is required is a cab enclosure that can be readily installed to retrofit a self-propelled earth moving machine to enclose the canopy cab.

According to the present invention there is provided a cab enclosure for a self-propelled earth moving machine which includes a plurality of flexible planar fabric panels. Each of the panels having a top edge, a bottom edge, opposed side edges, and at least one transparent viewing window. Mating fasteners are positioned along the opposed edges of each of the panels, whereby adjoining panels are secured together to form an enclosure. The top edge of each of the panels being secured to a canopy of an open metallic cab structure of the self-propelled earth moving machine, whereby the panels hang like drapes to enclose the cab.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
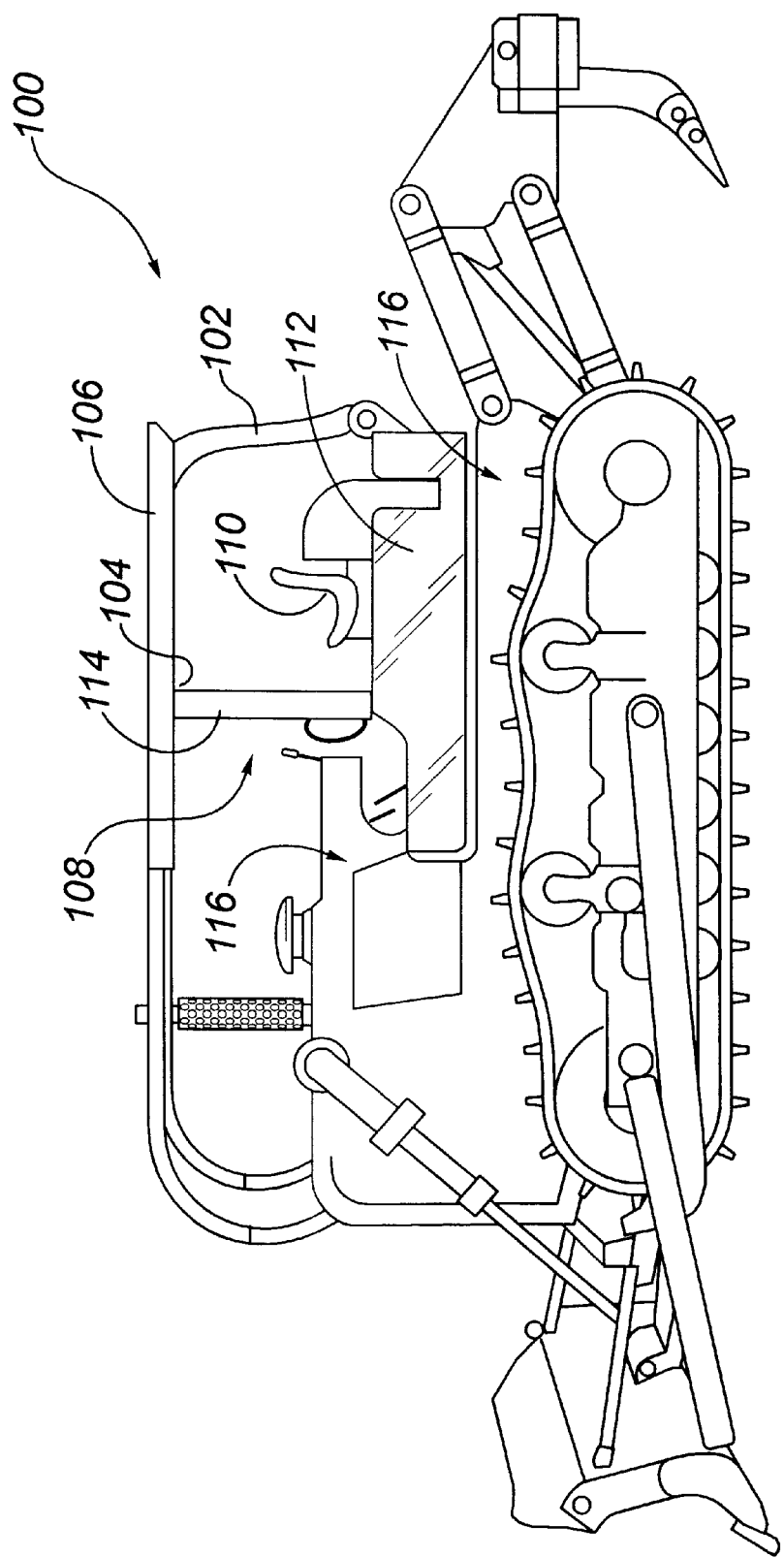
FIG. 1 labelled as PRIOR ART is side elevation view of a bulldozer.

The preferred embodiment, a cab enclosure generally identified by reference numeral 10, will now be described with reference to FIGS. 1 through 9.

Referring to FIG. 1, a self-propelled earth moving machine such as a bulldozer 100 includes an open metallic cab structure 102 set upon a superstructure 116 of bulldozer 100. Open metallic cab structure 102 has a metallic canopy or roof structure 106. Canopy 106 is supported by substantially vertical columns or support members 114 that extend upward from superstructure 116 and a substantially horizontal beam 104 spanning between the opposed sides of open metallic cab structure 102. Roof structure 106 extends over a front section 108 of the cab area and a driver's seat 110. In the absence of a protective enclosure, a driver seated in driver's seat 110 is unprotected from dust, mosquitos and inclement weather such as cold, high winds, or precipitation, except for such minimal protection afforded by low metallic side panels 112.

Figure 3:
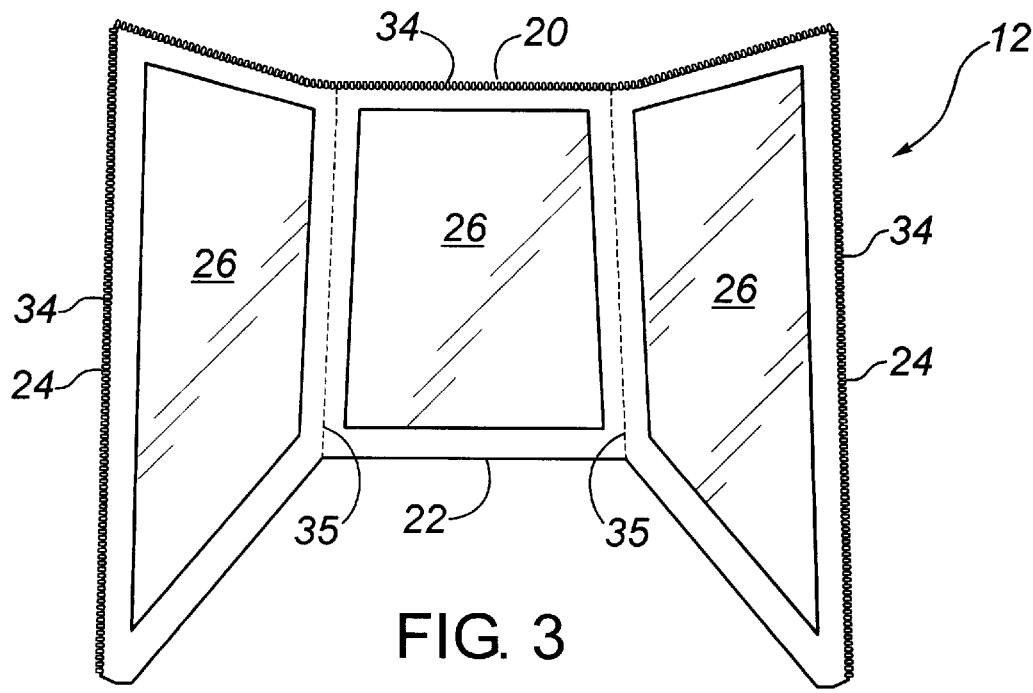
FIG. 3 is a front elevation view of a front panel of the cab enclosure illustrated in FIG. 2.
Figure 4:
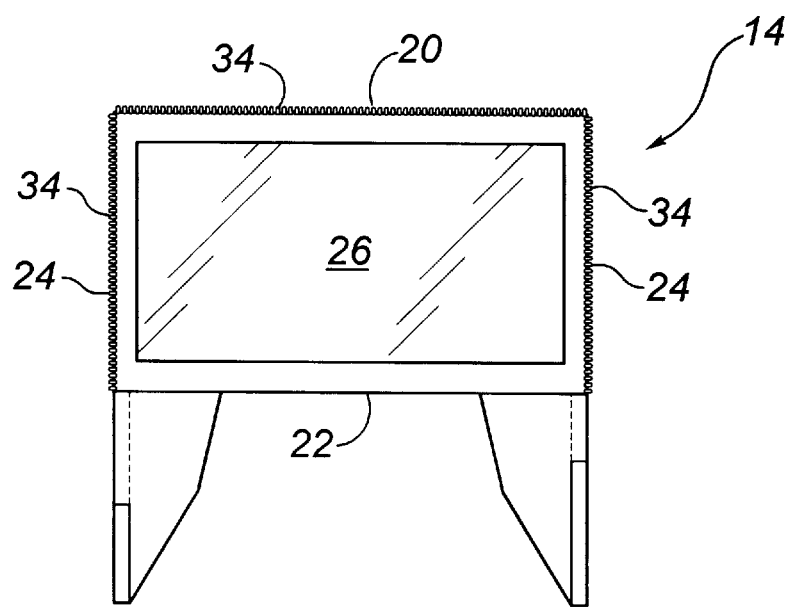
FIG. 4 is a rear elevation view of a rear panel of the cab enclosure illustrated in FIG. 2.
Figure 5:
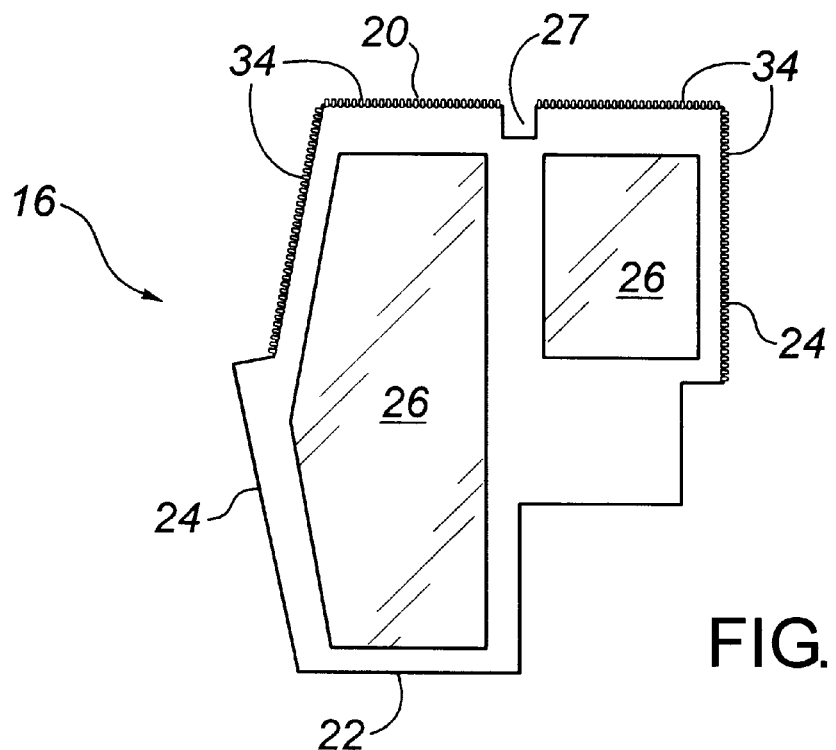
FIG. 5 is a side elevation view of a side panel of the cab enclosure illustrated in FIG. 2.
Figure 6:
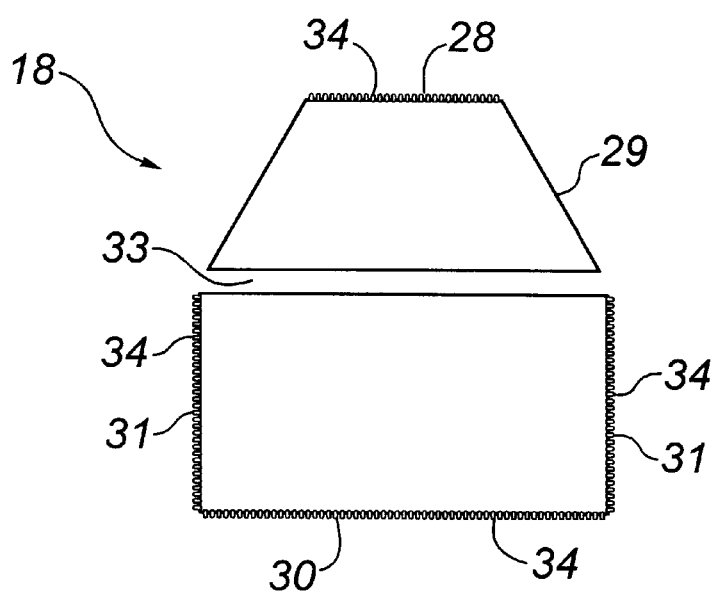
FIG. 6 is a top plan view of a top panel of the cab enclosure illustrated in FIG. 2.

Referring to FIGS. 3 through 6, cab enclosure 10 for a self-propelled earth moving machine includes a plurality of flexible planar fabric panels as will now be described. Referring to FIG. 3, there is a front panel 12. Referring to FIG. 4, there is a rear panel 14. Referring to FIG. 5, there is a mirror image pair of side panels 16. Referring to FIG. 6, there is a top panel 18 that is optionally attached, as will subsequently be described, below canopy 106 of open metallic cab structure 102. Referring to FIGS. 3 through 5, each of the front panel 12, rear panel 14, and side panels 16 has a top edge 20, a bottom edge 22, opposed side edges 24, and at least one transparent viewing window 26. Windows 26 can, optionally, have cover flaps or screens. Referring to FIG. 5, a notch 27 is provided in top edge 20 of each of side panels 16 to allow side panels 16 to be fitted under beam 104 of open metallic cab structure 102. Referring to FIG. 6, top panel 18 has a peripheral edge 29 comprising a front portion 28, a rear portion 30, and opposed side portions 31. Top panel 18 is substantially planar except where said top panel 18 has a recessed portion 33 to fit around beam 104 of open metallic cab structure 102. Referring to FIGS. 3 through 5, a plurality of zippers 34 serve as mating fasteners along opposed edges 24 of each of the adjoining panels 12, 14, and 16, whereby said adjoining panels 12, 14, and 16 are secured together to form an enclosure. Referring to FIG. 3, front panel 12 is foldable at positions indicated by dotted lines 35 so that front panel 12 can enclose fully the front section 108 of open metallic cab structure 102. Referring to FIG. 6, peripheral edge 29 of top panel 18 has a matching plurality of zippers 34 that serve as fasteners that mate with the corresponding zippers 34 on top edges 20 of front panel 12, rear panel 14, and side panels 16.

Figure 7:
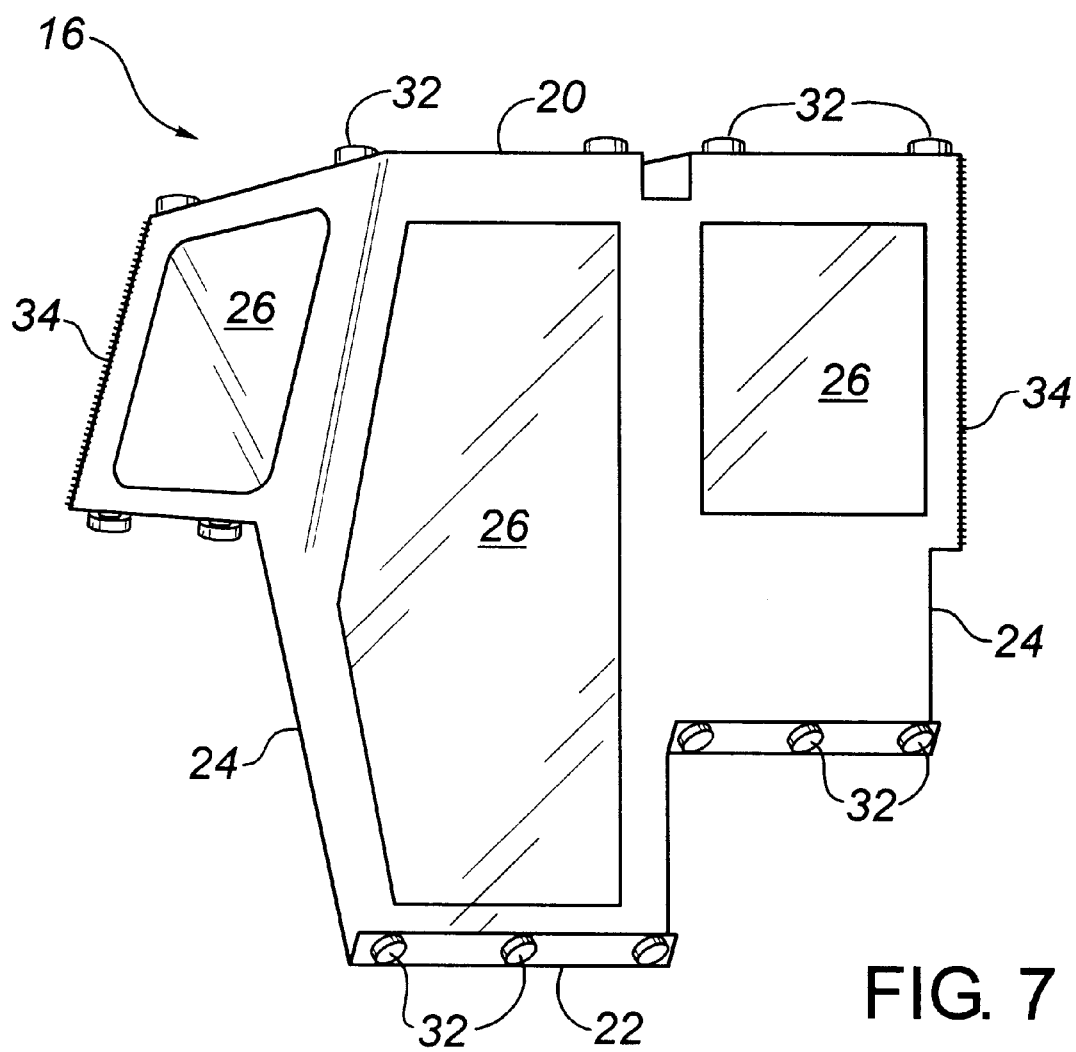
FIG. 7 is a detailed side elevation view of a side panel of the cab enclosure illustrated in FIG .2.
Figure 8:
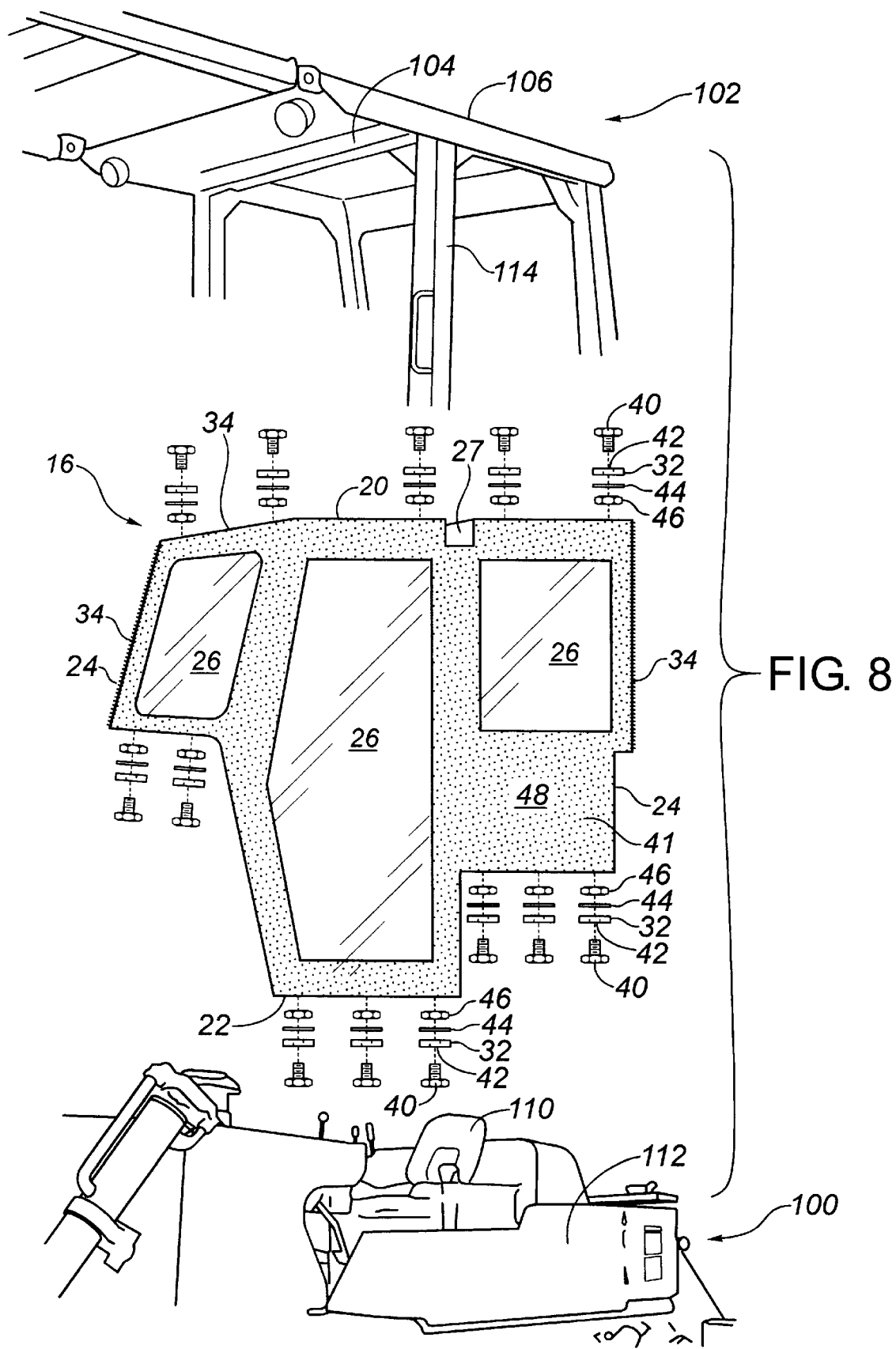
FIG. 8 is an exploded perspective view of the side panel portion of the cab enclosure illustrated in FIG. 2.

Referring to FIG. 7, in which one of mirror pair of side panels 16 is shown for purposes of illustration, a plurality of magnets 32 is spaced along top edges 20 and bottom edges 22 of each of front panel 12, rear panel 14, and side panels 16. Referring to FIG. 8, in which only side panel 16 is shown for purposes of illustration, magnets 34 are secured to top panel 12, rear panel 14, and side panels 16 as will now be described. Each magnet 34 is secured into position by a bolt 40 that passes through fabric 41, through a hole 42 in magnet 32, and through a washer 44, and is secured in position by a nut 46. In this manner, magnets 32 are secured in position to exterior surface 48 of fabric 41 along top edge 20 and bottom edge 22. Where a top panel 18 is used, it can function with or without magnets. When used without magnets, top panel 18 is held up by being secured to the other panels and relying upon the holding force of magnets 32 from the other panels. Where top panel 18 is used with magnets, magnets 32 are secured around perimeter 29 of top panel 18 in the same manner as described with the other panels.

Figure 2:
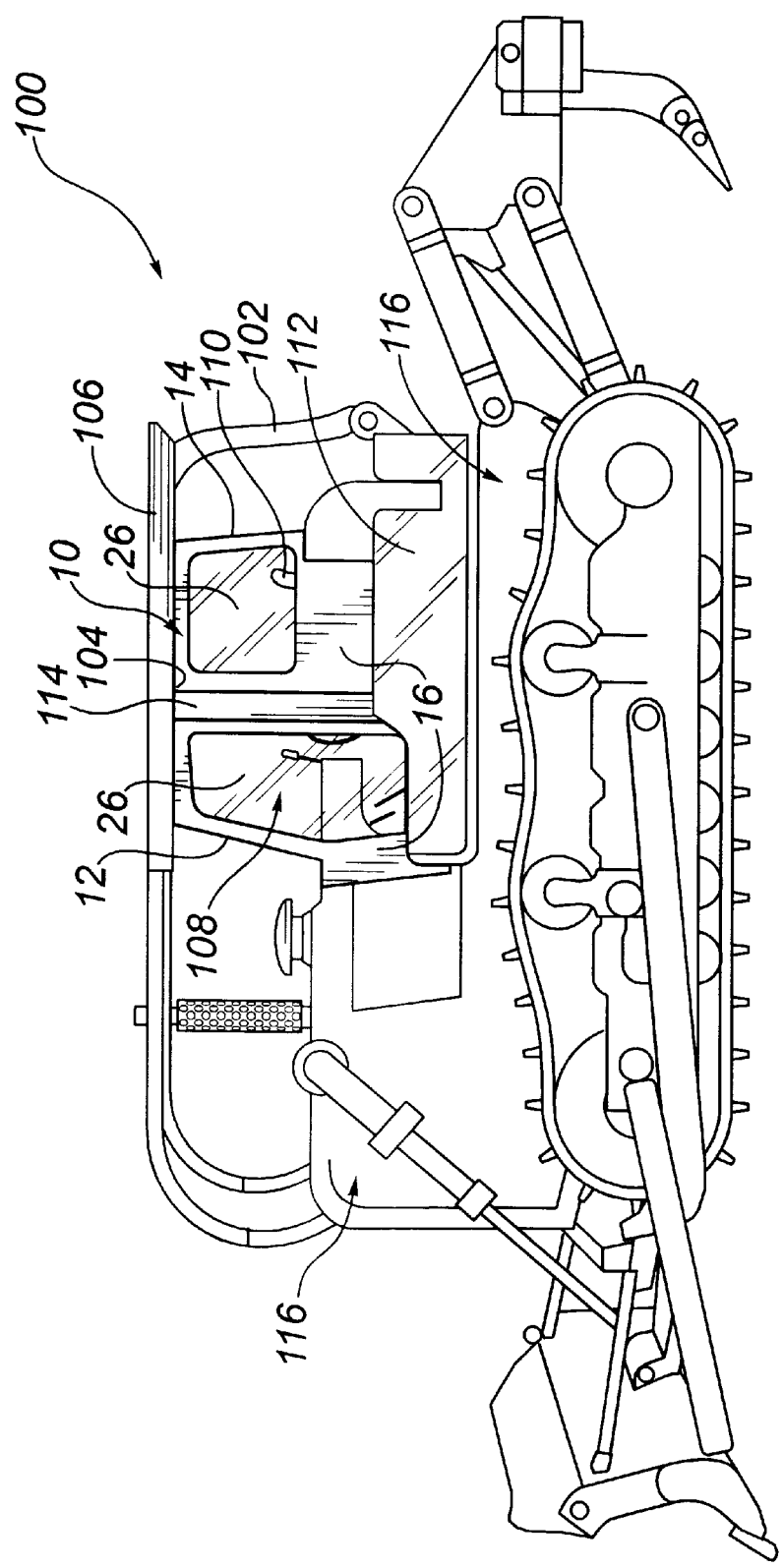
FIG. 2 is a side elevation view of the bulldozer illustrated in FIG. 1 with cab enclosed by the cab enclosure of the present invention.

The method of use of cab enclosure 10 will now be described with reference to FIGS. 1 through 8. Referring to FIG. 7, magnets are secured in a spaced arrangement adjacent to top edges 20 and bottom edges 22 of each of front panel 12, illustrated in FIG. 3, rear panel 14, illustrated in FIG. 4, and side panels 16, illustrated in FIG. 5. Referring to FIG. 8, magnets 32 along top edges 20 of front panel 12, rear panel 14, and side panels 16 are each magnetically secured to canopy 106, thereby securing said panels in a substantially vertical orientation so that they hang like drapes enclosing the cab. Optionally, magnets 32 along bottom edges 22 of front panel 12, rear panel 14 and side panels 16 are magnetically secured to superstructure 116 of bulldozer 100, to side panels 112 or to some other lower portion of open metallic cab structure 102. Referring to FIG. 2, front panel 12, rear panel 14, and side panels 16 are secured to each other by zippers 34 to form an enclosure within said cab structure 102. Top panel 18, illustrated in FIG. 6, can optionally be secured to front panel 12, rear panel 14, and- side panels 16 by zippers 34.

Figure 9:
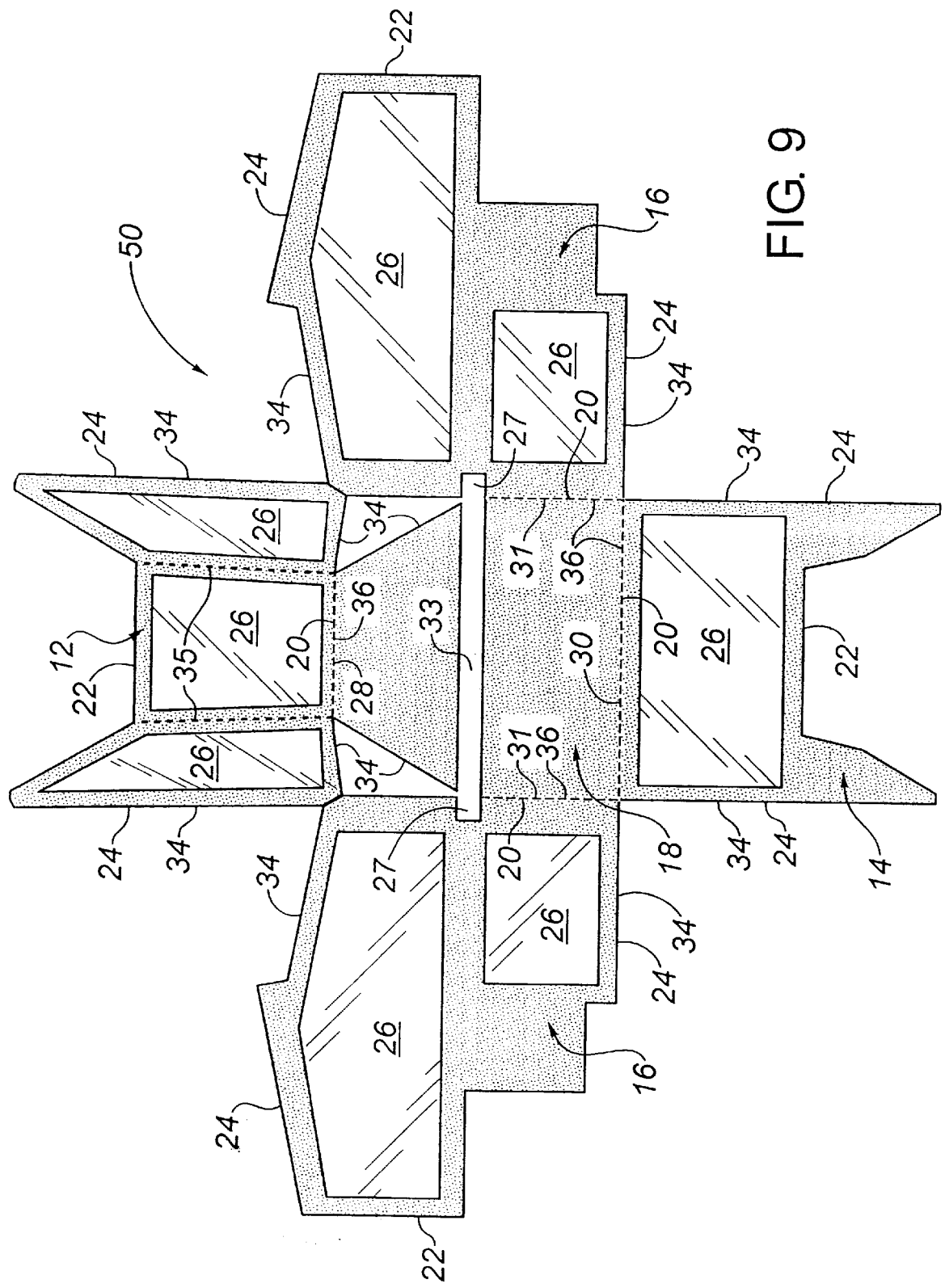
FIG. 9 is top plan view of the front panel, rear panel, left side panel, right side panel and top panel assembled to form the cab enclosure before installation.

Referring to FIG. 9, when it is possible for some models of equipment to have cab enclosure constructed as an integral unit 50, top edges 20 of each of panels 12, 14, and 16 are mated to corresponding portions 28, 30, and 32 of peripheral edge of top panel 18 by a seam indicated by a dashed line 36. An integral unit 50 so constructed is secured within open metallic cab structure 102 in a similar manner to that described above for individual front panel 12, rear panel 14, side panels 16, and top panel 18 of cab enclosure 10.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A cab enclosure for a self-propelled earth moving machine, comprising, in combination:

- the self-propelled earth moving machine having a metallic superstructure with an open cab having an overlying protective roof canopy held up by columns spaced at intervals about a periphery of the roof canopy with open spaces between the columns, the open cab only occupying a portion of the overlying protective roof canopy;
- a plurality of flexible planar fabric panels including a front panel, a rear panel, a left side panel, and a right side panel, each of the plurality of panels having a top edge, a bottom edge, opposed side edges, and at least one transparent viewing window;
- fasteners along the opposed edges of each of the plurality of panels, whereby adjoining panels are secured together;
- magnets along the top edge and the bottom edge of each of the plurality of panels;
- the top edge of each of the front panel, the rear panel, the left side panel and the right side panel being secured by the magnets to the roof canopy and hanging like drapes to surround and enclose only the portion of the roof canopy that overlies the open cab;
- the bottom edge of each of the front panel, the rear panel, the left side panel and the right side panel being secured by the magnets to the superstructure.

\* \* \* \* \*